US008761835B2

(12) United States Patent
Athley et al.

(10) Patent No.: US 8,761,835 B2
(45) Date of Patent: Jun. 24, 2014

(54) WIRELESS COMMUNICATION NODE AND A METHOD RELATED THERETO

(75) Inventors: Fredrik Athley, Kullavik (SE); Mikael Coldrey, Landvetter (SE); Sven Petersson, Savedalen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 241 days.

(21) Appl. No.: 13/376,265

(22) PCT Filed: Jun. 8, 2009

(86) PCT No.: PCT/EP2009/057053
§ 371 (c)(1),
(2), (4) Date: Dec. 5, 2011

(87) PCT Pub. No.: WO2010/142321
PCT Pub. Date: Dec. 16, 2010

(65) Prior Publication Data
US 2012/0083317 A1    Apr. 5, 2012

(51) Int. Cl.
*H04W 88/08*  (2009.01)
*H04B 17/00*  (2006.01)
*H04B 7/04*   (2006.01)

(52) U.S. Cl.
CPC .......... *H04B 17/0002* (2013.01); *H04B 17/004* (2013.01); *H04B 7/04* (2013.01)
USPC ........ 455/562.1; 455/60; 455/276.1; 370/334

(58) Field of Classification Search
CPC ...... H01Q 1/246; H01Q 1/247; H04W 88/08; H04W 88/10
USPC ........ 455/562.1, 269–295; 370/334; 375/127, 375/157
See application file for complete search history.

(56) References Cited

U.S. PATENT DOCUMENTS 8,526,553 B2 * 9/2013 Coldrey et al. ............... 375/346

2003/0080900 A1* 5/2003 Schumacher ................. 342/368
2004/0063469 A1* 4/2004 Kuwahara et al. ......... 455/562.1
2006/0197538 A1* 9/2006 Leinonen et al. ............. 324/533
2010/0273433 A1* 10/2010 Ozaki et al. ................. 455/67.11

FOREIGN PATENT DOCUMENTS

CN       101088016 A    12/2007
WO    2008073010 A1    6/2008

OTHER PUBLICATIONS

Search Report issued on Oct. 24, 2013 in corresponding Chinese application No. 200980159853.7, 2 pages.

* cited by examiner

*Primary Examiner* — Kamran Afshar
*Assistant Examiner* — Farideh Madani
(74) *Attorney, Agent, or Firm* — Rothwell, Figg, Ernst & Manbeck, P.C.

(57) ABSTRACT

The present invention relates to a wireless communication node (20A) connected to an antenna part (10A) with a plurality of antenna elements (1A, 2A, 3A, 4A) and antenna ports ($11A_1$, $11A_2$, $11A_3$, $11A_4$) over feeder ports ($21A_1$, $21A_2$, $21A_3$, $21A_4$). It comprises signal analyzing means (21A) adapted to analyze a signal received from a mobile station, and to, for each pair of antenna elements (1A, 2A, 3A, 4A), calculate the respective phase difference or phase angle between the signals from the elements of the pair, phase progression function handling means (26A) for calculating a phase progression function over the antenna ports, connection combination handling means (24A) adapted to find all possible combinations of connections between the antenna ports and the feeder ports and the corresponding phase angles or phase differences. It further comprises ordering means (25A) adapted to order said phase angles/phase differences, and fitting and error detecting means adapted (27A) to fit the ordered phase angles/differences to the phase progression function to find the errors between the ordered, calculated phase differences or phase angles corresponding to each connection combination and the phase progression function and to identify the connection combination for which the error of the fit is lowest.

25 Claims, 7 Drawing Sheets

WIRELESS COMMUNICATION NODE AND A METHOD RELATED THERETO

CROSS-REFERENCE TO RELATED APPLICATION

This application is a 35 U.S.C. §371 National Phase Entry Application from PCT/EP2009/057053, filed Jun. 8, 2009, and designating the United States.

TECHNICAL FIELD

The present invention relates to wireless communication nodes adapted to be connected to or comprising an antenna part with a plurality of antenna elements with respective antenna ports to which feeder ports of the communication node are connected. The antenna ports are associated with unique antenna port identifications and the feeder ports are associated with respective unique feeder port identifications. The invention also relates to a method for, in such a node, determining which feeder ports actually are connected to which antenna ports.

BACKGROUND

For antenna arrangements comprising a plurality of antenna elements, for example array antenna systems, it is generally of importance to know which antenna ports actually are connected to which feeder ports, i.e. to which radio chains. This means not only the way they should be connected, but how they have been connected. It is also of importance that they are connected in a specific desired manner which means that there is a need to exactly know which radio chain (feeder port) that is connected to which antenna port. An example when this is important is when there is an antenna part for which all elements, or subgroups of antenna elements, are located in such manner that the radio channel becomes significantly correlated. In one specific example the antenna part comprises a uniform linear array (ULA) intended to be used for sector covering transmission which means that the beam pattern simultaneously shall cover an entire sector. Such a beam pattern can be generated by the application of a weight vector with phase and/or amplitude taper. Then it is exceedingly important that the individual weights are applied to the intended or the appropriate antenna elements since otherwise the beam pattern will be distorted.

For generating a beam pattern with a desired shape by means of applying a weight vector to an antenna arrangement or an array antenna, i.e. beamforming, coherency is considered significant in order to obtain the desired beam shape. This means that the phase and the amplitude in all radio branches must be known with sufficient accuracy. If the feeder ports are incorrectly connected to the antenna ports, i.e. if radio paths are incorrectly connected to the antenna ports, the beam patterns will be distorted even if phase and amplitude relations are correct or as desired. This means that coherency can be seen as involving, in addition to phase, amplitude and time relations, also spatial locations.

In known arrangements mainly manual methods have been employed to ensure that cables are connected in the appropriate manner, i.e. that the feeder ports are connected to the antenna ports the way they should have been. A simple manual method consists in marking the cables at both ends. However, in practice cables are often connected incorrectly even if the cables have been marked. One reasons therefore is that there may be many feeder cables. Another reason is that configuration as well as reconfiguration or reconnection of cables often takes place quite far away from the antenna. A physical verification of the cabling is also difficult and time consuming considering that the antennas often are located in high masts. It is extremely difficult to assure if a connection has been established correctly and it is also complicated to handle connection errors since it is difficult to identify how the cables actually have been connected or what the errors are.

SUMMARY

It is a general object of the present invention to provide a wireless communication node through which it is possible to identify actual feeder cable connection orders. A particular object is to enable determination of connection errors. Another object is to provide a wireless communication node through which connection errors can be handled. It is further a particular object of the invention to be able to identify and possibly also handle connection errors in dual polarized antenna arrangements as well as in single polarized antenna arrangements or even more particularly to determine whether an antenna part is single or dual polarized. It is also a general object of the present invention to provide a method through which connection errors can be determined and possibly also handled or that an actual, current, feeder port connection order can be identified.

Therefore a wireless communication node as initially referred to is provided which comprises signal analyzing means adapted to analyze a signal received from a mobile station and to, for each pair of antenna elements, calculate the respective phase difference between the signals from the elements in the concerned pair. Alternatively it is adapted to calculate or establish the phase angles between the signals from the elements of the respective pairs. It also comprises a phase progression function handling means adapted to calculate or to collect or hold a phase progression function over the antenna ports using information about distances between the antenna elements and signal wavelength or simply about relationships between distances between antenna elements and/or distances and signal wavelength. It further comprises connection combination handling means for finding all possible combinations of connections between the antenna ports and the feeder ports (and for each such connection combination also the corresponding phase angles or phase differences). It also comprises ordering means which may form part of the connection combination handling means or be arranged as separate means, and which are adapted to order the phase angles or the phase differences (depending on implementation) for each connection combination.

It also comprises fitting and error detecting means adapted to fit the ordered phase angles or phase differences for each connection combination to the phase progression function to find the errors between the ordered phase differences or phase angles and from that to identify the connection combination for which the error of the fit is the lowest.

The identified connection combination may be the actual connection combination of antenna ports and feeder ports or the actual order in which the feeder ports are connected to the antenna ports.

According to the invention also a corresponding method is provided which is based on analyzing received uplink signals from a mobile station by collecting baseband signal samples. It further comprises the steps of: finding all possible combinations of antenna port and feeder port connections; establishing the phase differences (or phase angles) between each available different pair of antenna elements; ordering the phase angles or phase differences for each connection combination; using a phase progression function over the antenna ports based on information about at least relationships between distances between antenna elements and signal wavelength, or finding such a phase progression function and for each possible connection combination between feeder ports and antenna ports fitting the ordered phase angles or phase differences to the phase progression function. It further comprises the step of establishing or calculating the errors of said fit for each connection combination and identifying the feeder port connection order giving the lowest error.

It is an advantage of the invention that an automatic way of identifying which feeder cables have been connected to which antenna ports is provided. It is particularly an advantage that connection order can be identified without requiring marking of the cables and without having to rely on some other manual interaction. A particular advantage is that it is possible to identify in which order the feeder ports have been connected to the antenna ports, or which feeder cables have been connected to which antenna ports, also for a dual polarized antenna array or for an array where the antenna elements differ as far as some other characteristic, e.g. interdistance, phase etc. is concerned.

BRIEF DESCRIPTION OF THE DRAWINGS

The invention will in the following be more thoroughly described in a non-limiting manner and with reference to the accompanying drawings, in which.

DETAILED DESCRIPTION

Figure 1:
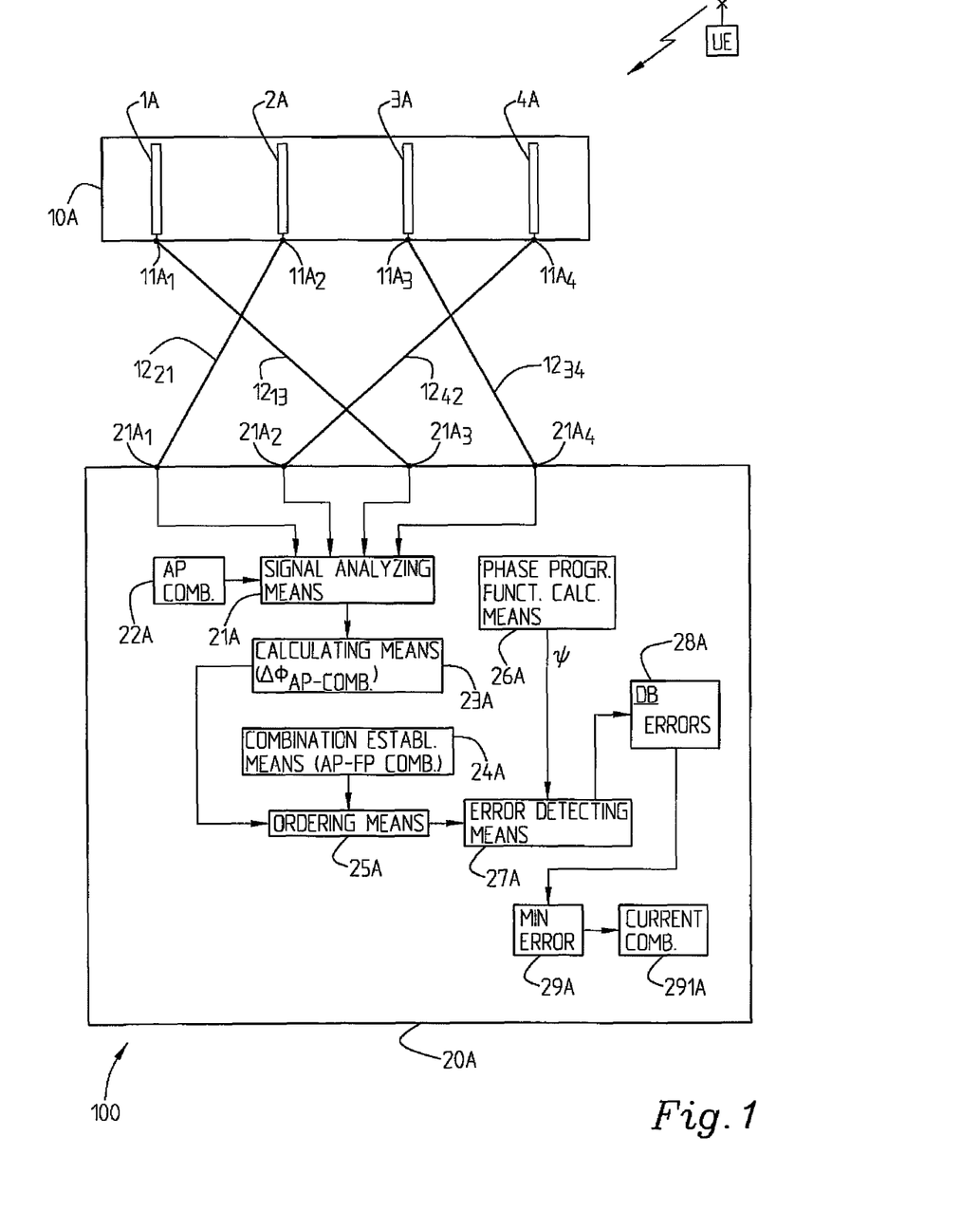
FIG. 1 is a block diagram of an embodiment of a wireless communication node connected to an antenna part with single polarized antennas.

FIG. 1 is a block diagram of an arrangement 100 in which a wireless communication node 20A is connected to an antenna part 10A with a plurality of antenna elements 1A, 2A, 3A, 4A which here are of the same polarization. It should be clear that the invention is not limited to order identification when there are four antenna elements, this merely relates to a particular example, there could be somewhat fewer antenna elements as well as considerably more antenna elements, particularly since the problem intended to be solved by the present invention tends to become more complicated and serious the more antenna elements there are. Each antenna element is connected to an antenna port AP; $11A_1$, $11A_2$, $11A_3$, $11A_4$. The antenna elements 1A, 2A, 3A, 4A are connected by means of feeder cables $12_{21}$, $12_{13}$, $12_{34}$, $12_{42}$ to feeder ports FP $21A_1$, $21A_2$, $21A_3$, $21A_4$. In this case the current connection combination is as follows: feeder port $21A_1$ has been connected to antenna port $11A_2$, feeder port $21A_2$ has been connected to antenna port $11A_4$, feeder port $21A_3$ has been connected to antenna port $11A_1$ and feeder port $21A_4$ has been connected to antenna port $11A_3$. It is for example supposed that feeder port $21A_1$ should, if correctly connected, have been connected to antenna port $11A_1$, feeder port $21A_2$ to antenna port $11A_2$, feeder port $21A_3$ to antenna port $11A_3$ and feeder port $21A_4$ to antenna port $11A_4$ but how they actually have been connected is not known and this is what is to be established according to one embodiment of the present invention.

The wireless communication node in this embodiment is a base station arrangement 20A which comprises receiving means handling signals from mobile stations UE. The receiving means are here supposed to comprise signal analyzing means 21A adapted to analyze signals received from a mobile station UE and to calculate the respective phase differences between the signals from each possible antenna element pair constellation. It is here further supposed that information about available antenna element pair combinations is provided from AP (Antenna Port) combination information providing means 22A. It should be clear that such means alternatively can be incorporated in the signal analyzing means. Information about pair combinations may be provided in any appropriate manner. It will here also be expressed as the phase differences between respective antenna ports for reasons of simplicity.

In FIG. 1 the functionality of calculating the phase differences is illustrated as being performed by separate processing means, calculating means 23A. Alternatively also this functionality can be incorporated into the signal analyzing means 21A. The base station arrangement further comprises or communicates with phase progression function calculating or establishing means 26A. According to different embodiments the phase progression function $\psi(k)$ over the antenna ports is based on information about distances between antenna elements and signal wavelength, relationships between antenna element distances or relationships between the distances. $\psi(k)$ can be provided externally of the base station arrangement or calculated in the base station arrangement, e.g. in separate processing means according to some embodiments. The base station arrangement also comprises combination establishing means 24A adapted to establish all possible combinations of connections between the antenna ports and the feeder ports, and also ordering means 25A adapted to, for each connection combination, order the corresponding phase differences. In ordering means 25A the phase differences are arranged in a desired or predetermined order for each combination (which also are arranged in order). It should be clear that the combination establishing means 24A and the ordering means 25A can be implemented in different ways, as separate processes in different units or processors or as a combined processing unit and they are also adapted to establish the number N of possible connection combinations.

Fitting and error detecting means 27A are adapted to fit the ordered phase differences as received from the ordering means 25A to the phase progression function. Information about the phase progression function is received from the phase progression function calculating or holding means 26A. The fitting operation is performed in order to find the errors between the ordered calculated phase differences corresponding to each connection combination and the phase progression function. The connection combination for which the error of the fit is the lowest is identified as the actual or current connection combination, e.g. the erroneous connection illustrated in FIG. 1A. Alternatively information is obtained about the actual order in which the feeder ports are connected to the antenna ports which e.g. are assumed to be arranged in a given consecutive order, in which case the current feeder port (FP) order would be {$21A_3$, $21A_1$, $21A_4$, $21A_2$}.

In a particular embodiment the base station arrangement 20A comprises a database or some other information holding means 28A adapted to hold information about the errors for each connection combination. Optionally a storing means 29A is provided which is adapted to hold information about minimum error and the connection combination giving the minimum error. Alternatively optional holding means are implemented as a single information holding means. Information about current connection combination or current connection order may be held in the above mentioned information holding means or in a separate current combination holding means 291A, for example implemented as a cache. It is particularly supposed that the antenna ports have unique antenna port identifications, here $11A_1$, $11A_2$, $11A_3$, $11A_4$, and correspondingly the feeder ports $21A_1$, $21A_2$, $21A_3$, $21A_4$ (also called $FP_{ij}$, FP1-FP4) have unique feeder port identifications.

In the embodiment discussed with reference to FIG. 1, it is supposed that the calculating means are adapted to calculate the respective phase differences. In an alternative embodiment the calculating means are adapted to compute phase angles of correlation coefficients for all spatial correlation lags as will be more thoroughly discussed with reference to FIG. 2.

Figure 2:
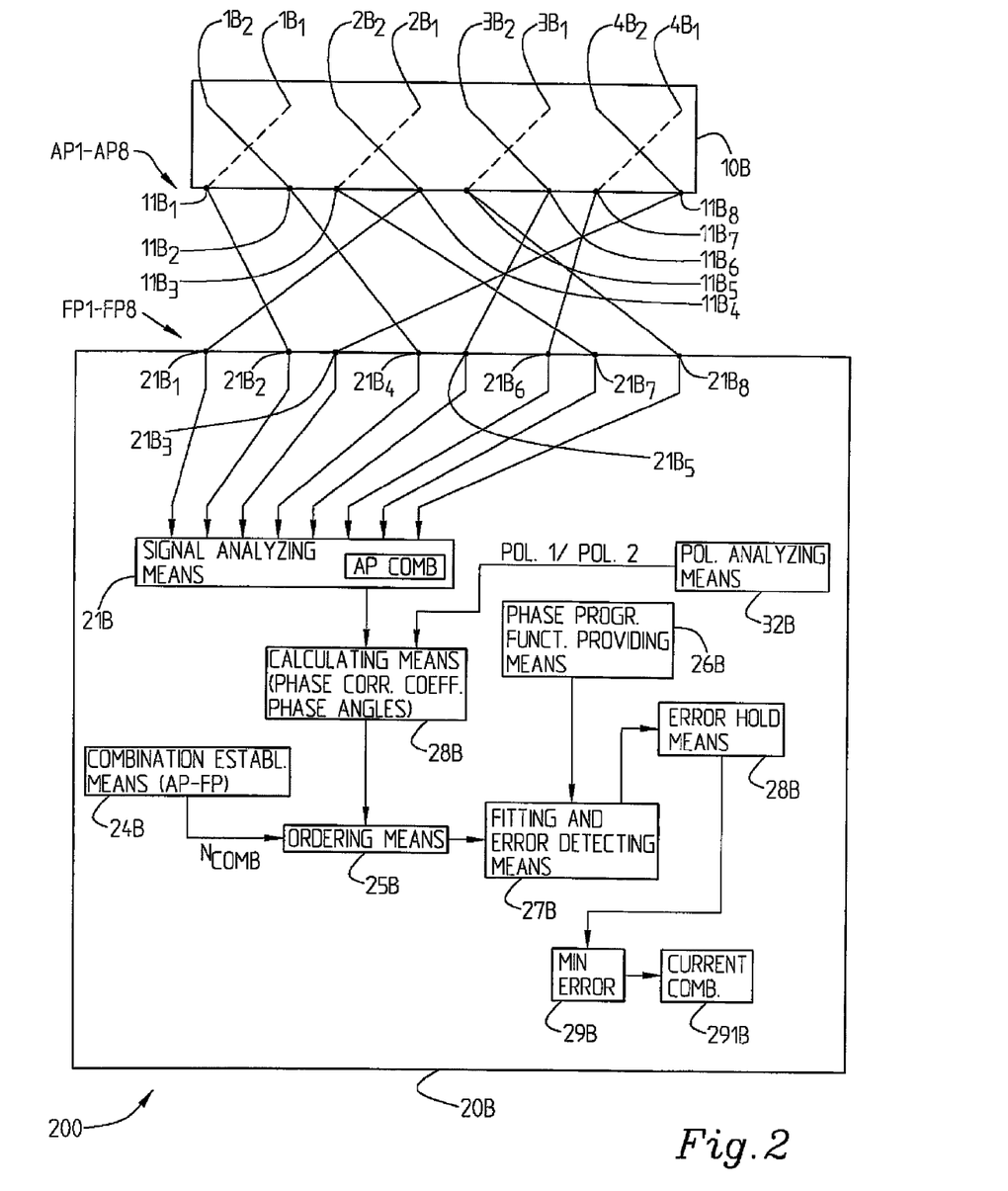
FIG. 2 is a block diagram of an embodiment of a wireless communication node connected to an antenna part with dual polarized antennas.

FIG. 2 shows an antenna arrangement 200 comprising a wireless communication node 20B, e.g. a radio base station arrangement, connected to an antenna part 10B with a plurality of first antenna elements $1B_1$, $2B_1$, $3B_1$, $4B_1$ having a first polarization and a plurality of second antenna elements $1B_2$, $2B_2$, $3B_2$, $4B_2$ having a second polarization different from said first polarization. It should be clear that the polarizations can be horizontal and vertical polarizations, +/−45° slanted polarizations, different elliptical polarizations etc. The antenna part 10B comprises a plurality of antenna ports $11B_1$, $11B_2$, $11B_3$, $11B_4$, $11B_5$, $11B_6$, $11B_7$, $11B_8$, also called AP1-AP8, which are arranged in the indicated order. The base station arrangement 20B comprises a plurality of feeder ports $21B_1$, $21B_2$, $21B_3$, $21B_4$, $21B_5$, $21B_6$, $21B_7$, $21B_8$ and here feeder port $21B_1$ has been connected to antenna port $11B_4$, feeder port $21B_2$ to antenna port $11B_1$, feeder port $21B_3$ to antenna port $11B_8$, feeder port $21B_4$ to antenna port $11B_2$, feeder port $21B_5$ to antenna port $11B_6$, feeder port $21B_6$ to antenna port $11B_7$, feeder port $21B_7$ to antenna port $11B_3$ and feeder port $21B_8$ to antenna port $11B_3$. As in the embodiment described with reference to FIG. 1, the base station arrangement 20B comprises signal analyzing means 21B, which here are supposed to incorporate the antenna element pair constellation information, i.e. information about all possible pairs of antenna elements or antenna ports. The signal analyzing means 21B comprises or communicates with calculating means, in this embodiment adapted to calculate phase angles of the correlation coefficients for all spatial correlation lags, 23B, i.e. correlation information received in the signal analyzing means 21B is used to find the phase angles.

The base station arrangement 20B also comprises means 24B adapted to establish or hold information about all possible connection combinations between antenna ports and feeder ports, and ordering means 25B adapted to, for each of the combinations as established in the combination establishing means 24B, order the phase angles of correlation coefficients for the respective combinations of feeder port to antenna port connections. In connection combination fitting and error detecting means 27B the errors are obtained from a fit of the respective ordered phase angles to the phase progression function provided by phase progression function calculating and holding means for the respective connection combination. In error holding means, for example a database 28B, the errors of each respective fit are stored, at least until all the connection combinations have been gone through and fitted to the phase progression function. The lowest error is found and it may in some embodiments be stored in a separate holding means 29B. The connection combination corresponding to the lowest error is identified as the current connection combination. Information about current connection combination may optionally be held in separate storing means 291B. It should be clear that the optional error holding means 28B, the lowest error holding means 29B and the current connection combination information holding means 291B can be implemented as a combined storing means. In the embodiment shown in FIG. 2 the antenna elements could alternatively have a single polarization. If the antenna part is dual polarized as shown in FIG. 2 the respective means illustrated in the block diagram of FIG. 2 are actually adapted to operate separately for elements of the different polarizations, meaning that first an identification of which ports belong to which polarization has to be done in polarization identifying means 32B, here only schematically indicated. Such an embodiment will be more thoroughly described with reference to FIG. 3.

Figure 3:
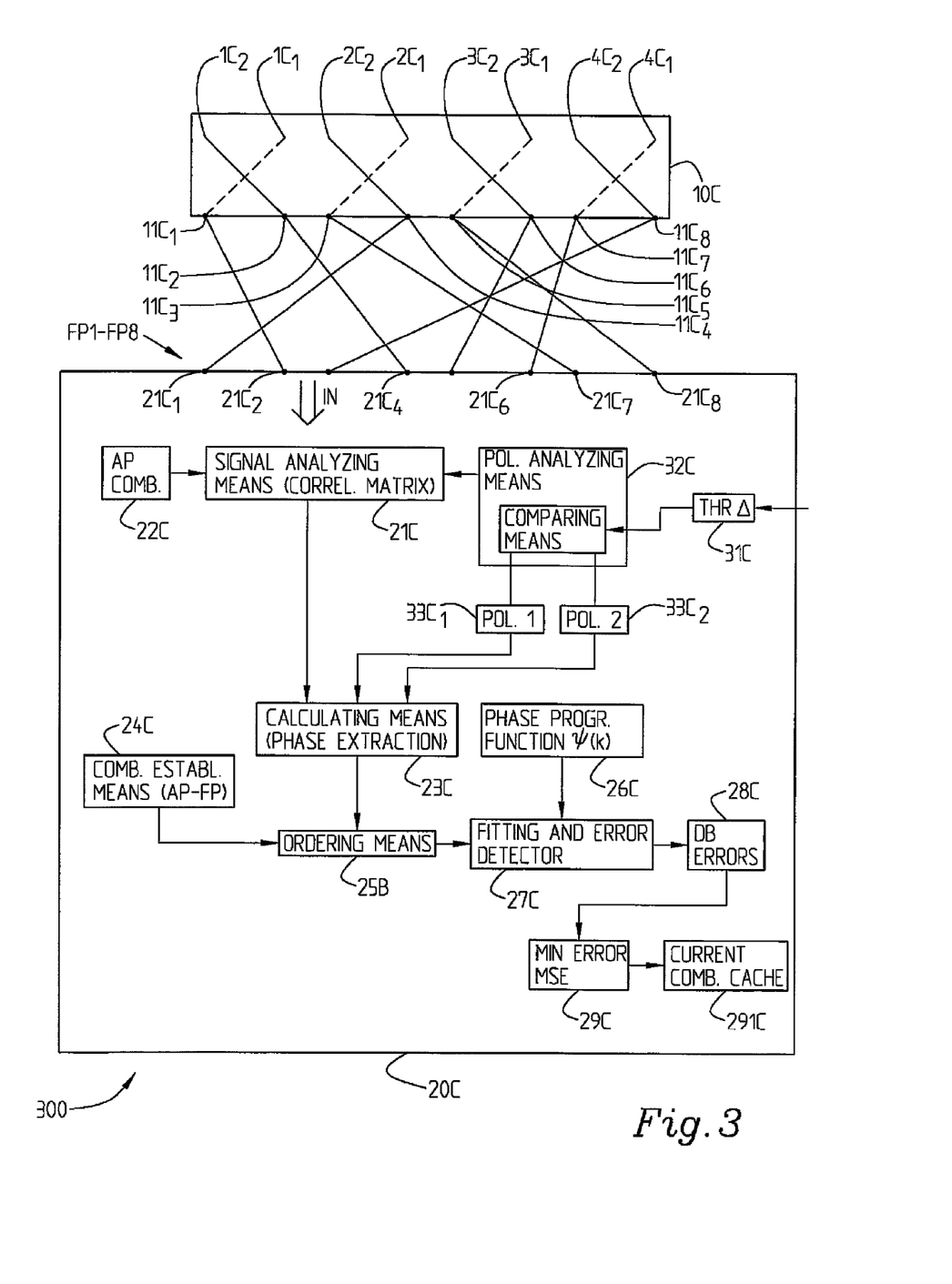
FIG. 3 is a block diagram of a wireless communication node as in FIG. 2 further including polarization detection means.

FIG. 3 shows an antenna arrangement 300 with a wireless communication node comprising a base station arrangement 20C which is connected to an antenna part 10C with a plurality of first antenna elements $1C_1$, $2C_1$, $3C_1$, $4C_1$ having a first polarization and a plurality of second antenna elements $1C_2$, $2C_2$, $3C_2$, $4C_2$ of another polarization, different from said first polarization. With each antenna element an antenna port is associated $11C_1$, $11C_2$, $11C_3$, $11C_4$, $11C_5$, $11C_6$, $11C_7$, $11C_8$ to which the feeder ports $21C_1$, ..., $21C_8$ should be connected by feeder cables in a pre-determined order, normally feeder port $21C_1$ to antenna $11C_1$ etc. However, as discussed above, errors may easily occur during connection of the cables. Here, in addition to the basic concept of the invention which is based on using measurements of uplink signals in order to identify order the feeder ports are connected to a given order of antenna ports, the base station arrangement 20C also comprises polarization analyzing means 32C. The polarization analyzing means 32C are adapted to determine which feeder ports are connected to antenna ports associated with the same polarization. The determination is based on the realization that co-polarized antennas have a high correlation whereas cross-polarized antenna elements have a low correlation.

Only after the determination in the polarization analyzing means the current connection order of the feeder ports belonging to one and the same polarization is determined, e.g. by matching the phase progression function to measured signals as discussed above with reference to FIG. 1 and FIG. 2.

In FIG. 3 signals are received by an array of four dual polarized antenna means each comprising a first and a second antenna element, here $1C_1$ and $1C_2$, $2C_1$, and $2C_2$ etc. from a UE (not shown). It is assumed that signals received on different polarizations have a low correlation whereas signals received on the same polarization have a high correlation, i.e. generally signals received over channels associated with first antenna elements have a high correlation, signals received over channels associated with second antenna elements have a high correlation, whereas signals received on a first and on a second antenna element have a low correlation. Possible multi-paths may have been resolved so that the antenna array 10C receives a planar wavefront from a distinct direction of arrival (DOA) for each multi-path component.

The phase progression function over the antenna ports 11C₁-11C₈ is calculated or collected in phase progression function handling means 26C. It can be described by a function $\psi(k)=2\pi d_k/\lambda \sin\theta$, where $d_k$ is the position of the $k^{th}$ antenna element, $\theta$ is the DOA measured relative to the normal of the array axis and $\lambda$ is the wavelength.

In a first step the feeder ports belonging to one and the same polarization have to be grouped together which is achieved by utilizing the fact that signals received over channels associated with antenna elements having different polarizations have a low correlation. This is carried out by means of signal analyzing means 21C collecting uplink signal samples from one mobile station or user equipment. The signal analyzing means 21C are also here illustrated as being in communication with the analyzing means 22C for establishing or receiving information about the number of available antenna port combinations. The provisioning of such information could be implemented and provided for in other manners as well. Then correlation matrix information is calculated in the signal analyzing means 22C comprising the correlation coefficients $$\rho_{ij}=r_{ij}/\sqrt{r_{ii}r_{jj}}, i=1,\ldots,K,\,j=1,\ldots,i,$$

wherein $$r_{ij} = \frac{1}{M}\sum_{m=1}^{M} x_i(t_m)x_j^*(t_m)$$

Here K=2N, N being the number of dual polarized antenna elements, and 2N being the total number of antenna/feeder ports, $x_i(t_m)$ is the complex baseband signal from a single user (user equipment) received from feeder port i at time instant $t_m$. It is here supposed that information about the correlation coefficients is provided to polarization analyzing means 32C even if the steps of signal analyzing, calculation, polarization analyzing can be carried out in a common processing arrangement. Subsequently feeder port pairs having a high correlation are to be found. In a first embodiment this is achieved by application of a predetermined, preferably reconfigurable, threshold to the modulus of $\rho_{ij}$, the correlation coefficient. In some embodiments a threshold input interface or a threshold information holding means 31C provides the threshold value. The threshold value can be selected to be between 0.2-0.8 but also other values are possible. In one embodiment it is supposed to be 0.5. In comparing means 32D of the polarization analyzing means the modulus of $\rho_{ij}$ is compared to the threshold value (THR Δ) so that $$\bar{\rho}_{ij} = \begin{cases} 1 & \text{if } |\rho_{ij}| > \Delta \\ 0 & \text{otherwise} \end{cases}$$

for $1,\ldots,K$ and $j=1,\ldots,i-1$. Generally $0<\Delta<1$ and all pairs of indices $\{i,j\}$ for which $\bar{\rho}_{ij}=1$ are to be identified. If the stated assumptions are valid for the measured signals and the value of Δ is chosen properly the number of such pairs should be N(N−1), here 12. These pairs are denoted $P_k$, $k=1,\ldots,$ N(N−1).

Alternatively the N(N−1), here 12, largest $|\rho_{ij}|$ are to be found and $k=1,\ldots,N(N-1)$ denotes the index pairs of these correlation coefficients. Since the signals received by antenna elements with different polarizations have low correlation the indices identified in the previous step will consist of two disjoint subsets; $S_1$ and $S_2$ where $S_1 \cap S_2 = \emptyset$ and $S_1 \cup S_2 = \{1, 2,\ldots,K\}$. Two sets, $I_1$ and $I_2$, of pair numbers are to be found such that:

$$\bigcup_{k \in I_1} P_k = S_1, \bigcup_{k \in I_2} P_k = S_2$$

The feeder port numbers in $S_1$ are assigned to polarization 1 and the feeder port numbers in $S_2$ to polarization 2.

Subsequently the order in which the feeder ports assigned to a first polarization have been connected to the antenna ports are to be identified. This is done separately from the identification of the feeder port connection order for a second polarization which can be performed in parallel or afterwards (or before). Subsequently the orders in which the feeder ports of polarization 1 (pol 1 held in storing means 33D₁) and of polarization 2 (pol 2 held in storing means 33D₂) respectively have been connected to the antenna ports are to be identified. This is achieved by fitting the phase progression function provided by phase progression function holding means 26C to the respective ordered phase angles of signals received in a signal analyzing means 21C.

A procedure for finding feeder ports belonging to polarization 1 will in the following be explained in a general manner. It should be clear that the same procedure takes place for polarization 2, with an obvious change of notations.

Let $T_j$ be a permutation of $S_1$, i.e. an ordered integer set containing the same integers as $S_1$ but taken in a different order. For every possible such permutation $T_j$ the following steps are performed:

i) computation of the phase angles of the correlation coefficients (by means of phase extraction means 23C)

$$\phi_i = \angle \rho_{mn}, \text{ where } m=T_j(i), n=T_j(1), i=1,\ldots,N.$$

Here $T_j(i)$ denotes the i-th element in $T_j$. If n>m, the symmetry relation $\rho_{mn}=\rho_{nm}^*$ can be used.

ii) In error detecting means 27C the mean square error (MSE) of a least squares fit of $\phi_i$ to the phase progression function $\psi(k)$ is calculated. In general this MSE is given by:

$$MSE = \phi^T \Pi$$

where $\phi=[\phi_1 \ldots \phi_N]^T$, $\Pi = I - H(H^T H)^{-1} H^T$ $$H = \begin{bmatrix} 1 & \ldots & 1 \\ d_1 & \ldots & d_N \end{bmatrix}^T$$

For a ULA (Uniform Linear Array) this simplifies to $$MSE = \sum_{i=1}^{N} \phi_i^2 - \sum_{i=1}^{N}\sum_{k=1}^{N}(a+bn+bk+ckn)\phi_i\phi_k,$$

where $$a = \frac{4N-2}{N^2+N},$$

$$b = -\frac{6}{N^2+N},$$

$$c = \frac{12}{N^3-N}.$$

Ordering of the phase angles is carried out by means 25C also establishing or receiving information about all possible combinations (and the number of combinations). The correct order of the feeder to antenna port connection combination within one polarization is then given by the permutation $T_k$ with the lowest MSE.

As discussed with reference to FIG. 2 all errors can be stored in database 28C and the minimum error can be stored in a separate holding means 29C, or alternatively in the database 28C. Information about the current connection order is stored in a cache or some other appropriate holding means 291C for both polarizations. Any storing facilities discussed or disclosed herein are optional.

With reference to the simplified block diagram in FIG. 4 a simulation example will be discussed.

Figure 4:
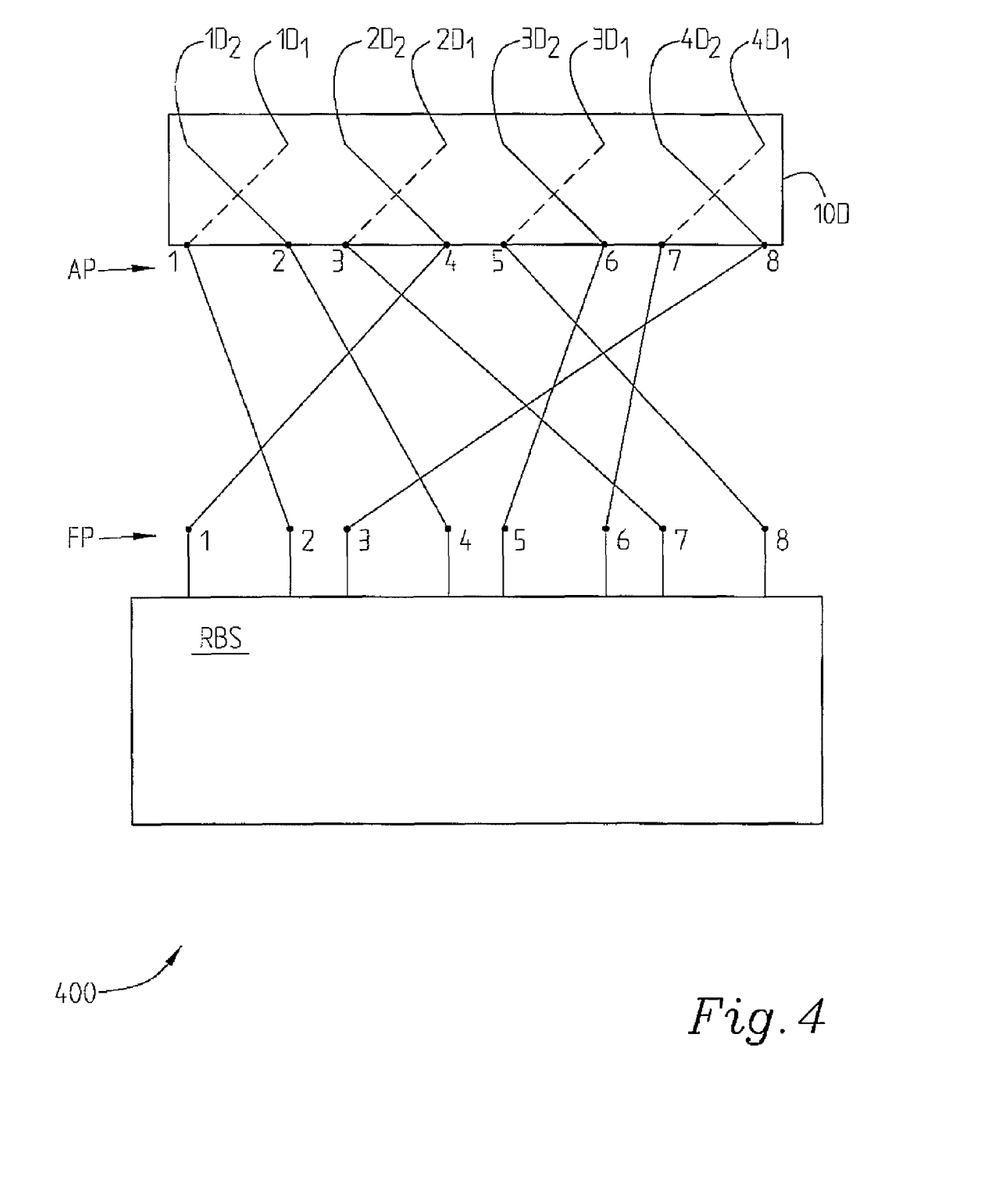
FIG. 4 is a schematical illustration of an erroneous feeder port and antenna port connection combination.

FIG. 4 very schematically illustrates a base station and antenna arrangement with an array antenna with four dual polarized antenna means each comprising two antenna elements of each a polarization, pol 1 and pol 2. Feeder cables have been incorrectly connected. N is the number of antenna means, i.e. four. In FIG. 4 the feeder ports are connected to polarization 1 in the following order: {2, 7, 8, 6}, and to polarization 2 in the following order: {4, 1, 5, 3}.

The signals that would have been received at complex baseband if the feeder cables were connected in the correct order ({2, 4, 6, 8} and {1, 3, 5, 7} respectively), are simulated by the following model:

$$x(t) = s(t) \otimes a(\theta) + n(t), t = t_1, \ldots, t_M$$

wherein $a(\theta)$ is the array steering vector for an array of co-polarized antenna elements. For a ULA the array steering vector has the form:

$$a(\theta) = [1 \exp[-j2\pi d/\lambda \sin\theta] \ldots \exp[-j2\pi(N-1)d/\lambda \sin\theta]]^T,$$

wherein d is the antenna element spacing (of co-polarized antenna elements) and $\theta$ is the DOA. $\otimes$ denotes the Kronecker matrix product and:

$$s(t) = \begin{bmatrix} s_1(t) \\ s_2(t) \end{bmatrix}, n(t) = \begin{bmatrix} n_1(t) \\ n_2(t) \end{bmatrix}.$$

Here $s_1(t)$, $n_1(t)$ are the signal and noise received in the first polarization pol 1 and $s_2(t)$, $n_2(t)$ are the signal and noise received in the second polarization, pol 2. All these signals are assumed to be mutually uncorrelated. The signals are modeled as white Gaussian noise with variance $\sigma_s^2$ for the signals and $\sigma_n^2$ for the noise. The signal-to-noise ratio is SNR=$\sigma_s^2/\sigma_n^2$=20 dB and the number of complex baseband time samples used for processing is here M=100. The DOA is assumed to be $\theta=10°$ and the antenna element spacing is d=$\lambda/2$.

The correlation coefficients can be computed from the sample covariance matrix $$\hat{R} = \frac{1}{M} \sum_{m=1}^{N} x(t_m) x^H(t_m)$$

by the above discussed calculation of correlation coefficients $\rho_{ij}$ and using that $r_{ij}$ is given by the $(i,j)^{th}$ element in R. However, since the feeder cables have been connected in the wrong order, the rows in x will be exchanged. This can be described mathematically by pre-multiplying x by a K×K permutation matrix P. A permutation matrix is a matrix with exactly one 1 in each row and each column and zeros elsewhere. For example, the 4×4 permutation matrix $$P = \begin{bmatrix} 0 & 1 & 0 & 0 \\ 1 & 0 & 0 & 0 \\ 0 & 0 & 0 & 1 \\ 0 & 0 & 1 & 0 \end{bmatrix}$$

will exchange row 1 with row 2 and row 3 with row 4 when pre-multiplying a 4×1 vector.

The effective sample covariance matrix, $\tilde{R}$, when the feeder cables have been connected in the wrong order will therefore be $$\tilde{R} = P\hat{R}P^T$$

wherein P is a 8×8 permutation matrix. For the cable connection in FIG. 1 this permutation matrix will be:

$$P = \begin{bmatrix} 0 & 0 & 0 & 1 & 0 & 0 & 0 & 0 \\ 1 & 0 & 0 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 1 & 0 & 0 & 0 & 0 & 0 \\ 0 & 0 & 0 & 0 & 1 & 0 & 0 & 0 \end{bmatrix}$$

The thresholded modulus of the correlation coefficients from $\tilde{R}$ is then computed according to the previous description. The result can be summarized in the following table:

$$\begin{bmatrix} 0 & & & & & & \\ 1 & 0 & & & & & \\ 1 & 0 & 1 & & & & \\ 1 & 0 & 1 & 1 & & & \\ 0 & 1 & 0 & 0 & 0 & & \\ 0 & 1 & 0 & 0 & 0 & 1 & \\ 0 & 1 & 0 & 0 & 0 & 1 & 1 \end{bmatrix}$$

where $\overline{\rho_{ij}}$ is given by i-th row and j-th column in this table. From this table it can be deduced that the feeder port numbers {1, 3, 4, 5} belong to one polarization and that feeder port numbers {2, 6, 7, 8} belong to the other polarization. This is consistent with the actual, current cable connections shown in FIG. 4.

The next step is then to compute the MSE of a least squares fit of the phase angles to a linear phase progression over every possible permutation of the ordered integer sets {1, 3, 4, 5} and {2, 6, 7, 8}. This gives that the order {4, 1, 5, 3} and {2, 7, 8, 6} produce the lowest MSE. This is also consistent with the cable connection shown in FIG. 4.

Figure 5:
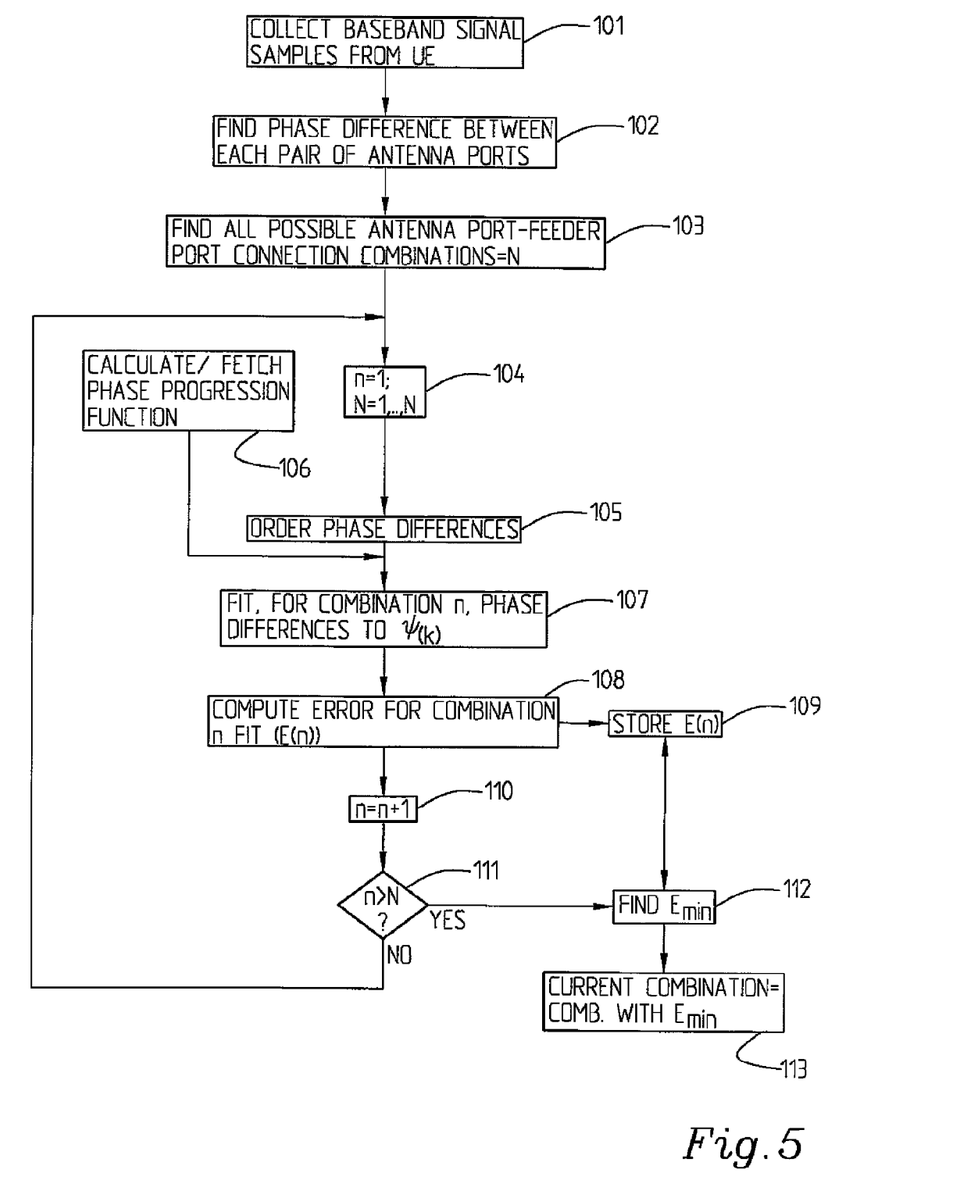
FIG. 5 is a flow diagram of an embodiment in which connection order is identified in a communication node connected to single polarized antennas.

FIG. 5 is a flow diagram describing one embodiment of a procedure for identifying the feeder port connection order. Here the antenna part is a single polarized antenna or the procedure for one of the polarizations of a dual polarized antenna is described. Thus, first uplink baseband signal samples from one user equipment, here UE1, are collected, 101. The phase differences between each pair of antenna ports are calculated or established, 102. Then all possible antenna port to feeder port connection combinations are found as well as the number of possible combinations (N), 103. This can be done simultaneously with, before, or after the finding of the phase differences between the pairs of antenna ports (according to different embodiments).

Then, for each possible combination, starting with combination n=1, the phase differences are ordered according to the n:th combination of feeder to antenna port cable connection, 105. A fit is performed, 107, for all combinations of the phase differences to the phase progression function ψ(k) which has been calculated or fetched in step 106. For the concerned combination, n, the error of the ordered phase differences to the phase progression function is found, 108, and it is also stored in storing means, 109. It is then proceeded with the next combination, n+1, 110, unless all combinations have been gone through, which is established in a comparing step (n>N?), 111. When all the connection combinations have been fitted and the respective errors been found an activation signal or similar is provided to the storing means holding the errors and the minimum error is found, 112. It is established to which connection combination the minimum error belongs. The current combination is then given as the combination with the lowest error, 113, i.e. which is the actual combination, for example connection combinations {2, 7, 8, 6} for the first polarization as discussed with reference to the example given in FIG. 4.

Figure 6:
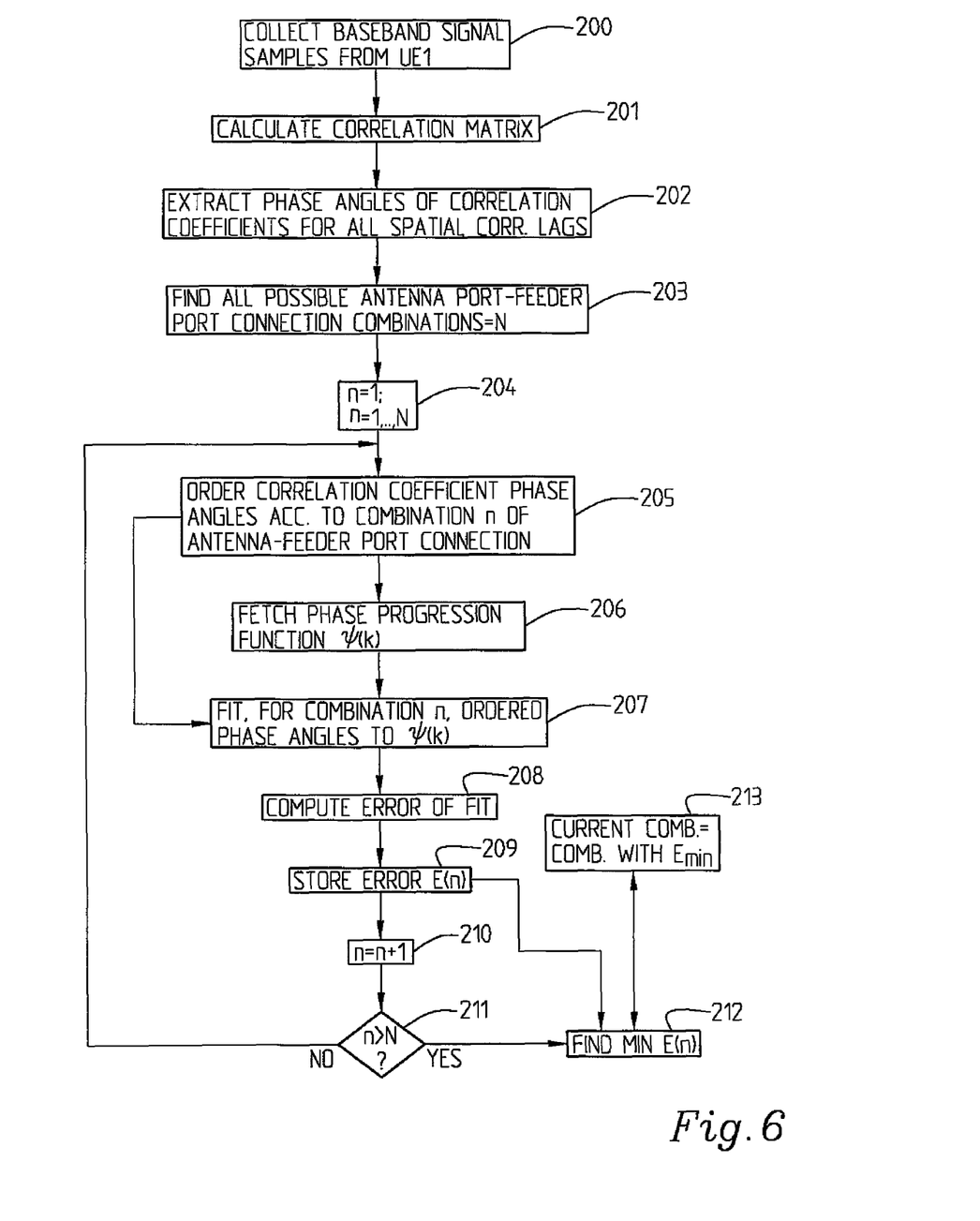
FIG. 6 is a flow diagram of a second embodiment in which connection order is identified in a communication node connected to single polarized antennas.

FIG. 6 is a flow diagram describing an alternative implementation in which, instead of the phase differences, information about phase angles of correlation coefficients is used. As in FIG. 5 uplink baseband signal samples from UE1 are collected, 200. Then the correlation matrix is calculated, 201, which can be done in any appropriate manner. Subsequently the phase angles of the correlation coefficients are extracted for all spatial correlation lags, i.e. distance differences between two respective antenna elements. As in the preceding embodiments this can be done simultaneously, before or after step 202 or even step 201. All possible antenna port and feeder port connection combinations are found, established to be N, 203. Then for each connection combination the correlation coefficient phase angles for the respective combinations of antenna to feeder port connections are ordered, 205. The phase progression function is fetched or calculated, 206, in any appropriate manner and the ordered correlation coefficient phase angles, the ordered phase angles for each combination n, are fitted to the phase progression function ψ(k), 207. Then the error of each respective fit is calculated, 208, and stored, 209. Then it is proceeded with the next connection combination, 210, until all connection combinations have been gone through, 211. Information about the stored errors is used to find the minimum error, 212, which corresponds to one of the connection combinations and the current or actual connection combination is determined to be the combination with the minimum error, 213. The minimum error can be detected in any appropriate manner, also without storing of errors. Information about current connection combination can be optionally stored or used in any appropriate manner, which does not form part of the present invention.

Figure 7:
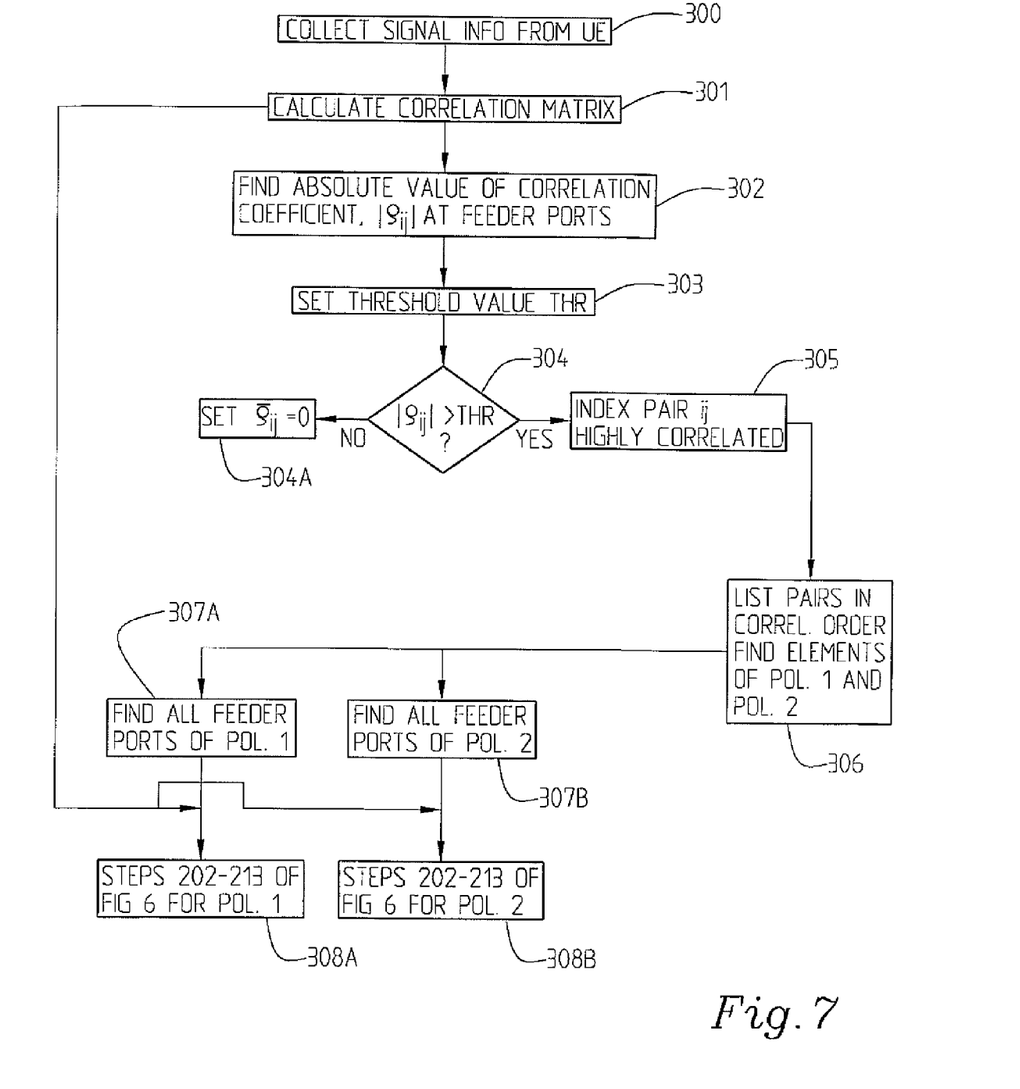
FIG. 7 is a flow diagram of an embodiment wherein a wireless communication node is connected to a dual polarized antenna.

FIG. 7 is a simplified flow diagram describing a procedure when a wireless communication node is connected to an antenna part which comprises a plurality of dual polarized antenna means. It has first to be established which antenna elements belong to which polarization. As described above signaling information from UE1 is collected in phase analyzing means, 300, and the correlation matrix is calculated, 301. Then the modulus of the correlation coefficients $|\rho_{ij}|$ at the feeder ports are calculated as discussed above, 302. A threshold value THR is set, 303. It can be set or provided in any manner during the procedure or it may have been set at an earlier stage. This can be done in different manners depending on application, e.g. manually. It is then established if the modulus of the correlation coefficient is larger than the threshold value, 304. If not, $\overline{\rho_{ij}}$ is set to 0, 304A whereas if the modulus of the correlation coefficient exceeds the set threshold value, this is an indication that the elements of index pair ij are highly correlated, 305, and the pairs are listed in order to identify elements of polarization 1 and polarization 2 respectively, 306, as more thoroughly described above with reference to FIG. 3. Then, in parallel, or consecutively, using the calculated correlation matrix as found in step 301 above, all feeder ports of polarization 2, 307A, and all feeder ports of polarization 1 are found, 307B. Then steps 202-213 of FIG. 5 are implemented separately for polarization 1 and for polarization 2 respectively, 308A, 308B. The current connection orders are found separately for the respective polarizations.

The invention is not limited to the specifically illustrated embodiments but it can be varied in a number of ways within the scope of the appended claims. Particularly information about if there is one or two polarizations can be available but the procedure as described for example in FIG. 5 can also be used to actually establish if there is one polarization or if there are two polarizations. In that case it is first detected if it is a single or dual polarized antenna through identification of how many pairs with a high correlation there are. If the number of pairs with a high correlation is high (where the definition of high can be different for different implementations) it is supposed that it is a single polarized antenna whereas if the number is low, particularly lower than a given second threshold value (not corresponding to the threshold value THR Δ discussed earlier in the application) it is supposed to be a dual polarized antenna. The relationship between the number of pairs with a high correlation and the number of pairs with a low correlation can alternatively be used.

The inventive concept is applicable to any wireless communication node such as a radio base station, a relay node, a repeater, a microwave link or similar.

The invention claimed is:

1. A wireless communication node adapted to be connected to an antenna part with a plurality of antenna elements and one antenna port for each of the plurality of antenna element, the wireless communication device comprising:

a plurality of feeder ports to be connected to the plurality of antenna elements via respective antenna ports, each antenna port being associated with a unique antenna port identification, and each feeder port being associated with a unique feeder port identification;

a signal analyzing unit to analyze a signal received from a mobile station, and to, for each pair of antenna elements, calculate respective phase difference or phase angle between the signals from the antenna elements of the pair;

a phase progression function handling unit to calculate or collect a phase progression function over the antenna ports based on information about relationships between distance between antenna elements and signal wavelength;

a connection combination handling unit to find all possible combinations of connections between the antenna ports and the feeder ports and for each connection combination the corresponding phase angle or phase difference;

an ordering unit to order the phase angles or phase differences for each combination; and an error detecting unit to fit the ordered phase angles or differences to the phase progression function to find the errors between the ordered, calculated phase differences or phase angles corresponding to each connection combination and the phase progression function and to identify the connection combination for which the error of the fit is lowest.

2. The wireless communication node according to claim 1, wherein the identified connection combination refers to the actual connection combination of antenna ports and feeder ports or the actual order in which the feeder ports are connected to the antenna ports being arranged in a given order.

3. The wireless communication node according to claim 1, further comprising
a connection combination modification unit for correcting or modifying the identified actual feeder port connection order to a predetermined, correct, feeder port connection order or to compensate for connection errors.

4. The wireless communication node according to claim 1, wherein the signal analyzing unit comprises a correlation coefficient calculation unit and the node further comprises an extracting unit to, from the respective correlation coefficients, extract respective phase angles for all different spatial antenna element distances.

5. The wireless communication node according to claim 1, wherein all antenna elements have the same polarization.

6. The wireless communication node according to claim 1, wherein the antenna elements comprise first antenna elements having a first polarization and second antenna elements having a second polarization which is different from said first polarization.

7. The wireless communication node according to claim 1, further comprising a connection information handling unit
to receive or collect information about correct or current connection combination or feeder port connection order from holding unit holding information about correct or current connection combination or order and to use information about the current connection order for direction of arrival in uplink and/or for beamforming in downlink.

8. The communication node according to claim 1,
further comprising a storing unit to hold information about the errors, comprising mean square errors between the ordered phase differences or angles and the best fit of said ordered phase differences to the phase progression function for each possible connection combination or connection order, and/or storing unit holding the lowest error indicating the correct or the current connection combination or order.

9. The wireless communication node according to claim 1, further comprising a polarization analyzing unit to be in communication with the signal analyzing unit.

10. The wireless communication node according to claim 9,
wherein the polarization analyzing unit is to determine which of the feeder ports are associated with one and the same polarization by analyzing the correlation coefficients.

11. The communication node according to claim 10,
wherein the polarization analyzing unit is to acquire information about the correlation coefficients, each of which comprising a phase angle and a modulus, and to extract the moduli of the respective correlation coefficients, $|\rho_{ij}|$; i=1, ..., K; K being the total number of antenna elements, and j=1, ... i.

12. The wireless communication node according to claim 11,
wherein the polarization analyzing unit comprises a polarization multiplicity detecting unit to establish if the antenna part comprises antenna elements of different polarizations or more than one polarization by determining if the number of pairs with a high correlation exceed a given second threshold value, or if the number of pairs with a low correlation fall below a given second threshold value.

13. The wireless communication node according to claim 11,
wherein the polarization analyzing unit is to distinguish feeder port pairs having a high correlation by comparing each correlation coefficient modulus with a predetermined threshold value, $\Delta_{thr}$, so defined that if $|\rho_{ij}|>\Delta_{thr}$, $\bar{\rho}_{ij}=1$, otherwise $\bar{\rho}_{ij}=0$, for i=1, ..., K and j=1, ..., i−1, and to identify all pairs of indices $\{i,j\}$ for which $\bar{\rho}_{ij}=1$, comprising pairs of feeder ports having the same polarization, and $\bar{\rho}_{ij}=0$ relating to pairs of feeder ports having different polarizations.

14. The wireless communication node according to claim 13,
wherein the threshold value THR $\Delta$ is selected to be between 0.2-0.8.

15. The wireless communication node according to claim 11,
wherein the polarization analyzing unit is to sort the values of the moduli of the respective correlation coefficients into a first group having lower values and into a second group having higher values, said groups containing a desired number of elements and being disjoint, and to determine which antenna elements have the first and the second polarization whereby antenna element pairs for which the correlation coefficient modulus exceed the threshold value have the same polarization, antenna element pairs for which the correlation coefficient modulus is low, have different polarization.

16. The wireless communication node according to claim 9,
wherein the calculating unit, the ordering unit and the error detecting unit is to determine current connection combination independently and separately for each polarization.

17. The wireless communication node according to claim 4,
wherein the error detecting unit is to calculate the mean square errors (MSEs) for the plurality of connection combination by unit of a least square (LS) approximation of the phase angles differences $\phi_i = \angle \rho_{mn}$; $m=T_j(i)$, $n=T_j(1)$, i=1, ..., N; each $T_j$ being a permutation of an ordered identification set containing an ordered set of feeder ports of the same polarization, to the phase progression function $\psi_k = 2\pi d_k/\lambda \sin\theta$, $d_k$ being the position of antenna element k, $\theta$ being direction of arrival measured relative to the normal of an axis formed by the antenna elements, $\lambda$ being the signal wavelength.

18. A method for, in a wireless communication node connected to an antenna part comprising a plurality of antenna elements associated with respective antenna ports, determining connection combination between the antenna ports and feeder ports of the wireless communication node, each antenna port being associated with an antenna port identification and each feeder port being associated with a feeder port identification, the method comprising:
receiving an uplink signal from a mobile station via the antenna elements;
analyzing the received uplink signal by collecting baseband signal samples;
finding all possible combinations of antenna port and feeder port connections;

establishing phase differences or phase angles between each available different pair of ordered antenna elements;

ordering, for each connection combination, the phase angles or phase differences;

using a phase progression function over the antenna ports based on information about distance between antenna elements, and signal wavelength;

fitting, for each possible connection combination, the ordered phase angles or phase differences, to the phase progression function, and calculating, for each connection combination, the error of said fit; and identifying the connection combination or feeder port connection order having the lowest error.

19. The method according to claim 18,
wherein the phase angle establishing step comprises:
calculating a correlation matrix comprising correlation coefficients; and
extracting the respective phase angles from the respective correlation coefficients.

20. The method according to claim 19,
further comprising:
defining a threshold value to distinguish between feeder port pairs having a high and a low correlation; and
examining if the number of feeder port pairs haing a high correlation exceeds or falls below a given, second threshold value to determine if the antenna part comprises antenna elements with one or more polarizations.

21. The method according to claim 19, wherein
the antenna elements comprise first antenna elements having a first polarization and second antenna elements having a second polarization different from said first polarization, and
the method further comprises:
determining, using correlation coefficient information, which feeder ports are connected to first antenna elements and which feeder ports are connected to second antenna elements; and
grouping the feeder ports connected to first antenna elements into a first group and the feeder ports connected to second antenna elements into a second group.

22. The method according to claim 21,
wherein the determining step comprises:
extracting or calculating the moduli of the correlation coefficients, $|\rho_{ij}|$;
finding feeder port pairs with a high correlation; and
identifying feeder ports of pairs having a high correlation as feeder ports connected to antenna elements with the same polarization.

23. The method according to claim 22,
wherein the finding step comprises:
defining a threshold value $\Delta_{thr}$ to distinguish between correlated and uncorrelated feeder port pairs; and
comparing the modulus of each respective correlation coefficient, $|\rho_{ij}|$, with the threshold value such that if the modulus $|\rho_{ij}|$ for a feeder port pair $>\Delta_{thr}$, the feeder ports of the pair are considered to belong to the same polarization.

24. The method according to claim 22,
wherein the finding step comprises:
establishing the moduli of the correlation coefficients; and
determining feeder ports belonging to the respective polarization by using the pairs with the highest moduli of the correlation coefficients such that the number of feeder ports in each group is the same as the actual number of antenna elements with the respective polarization.

25. The method according to claim 20, further comprising:
performing the calculating and identifying steps for finding the current connection combination or feeder port connection order separately for the feeder ports belonging to the first and second polarization or group respectively.

* * * * *

UNITED STATES PATENT AND TRADEMARK OFFICE
CERTIFICATE OF CORRECTION

| | | |
|---|---|---|
| PATENT NO. | : 8,761,835 B2 | Page 1 of 1 |
| APPLICATION NO. | : 13/376265 | |
| DATED | : June 24, 2014 | |
| INVENTOR(S) | : Athley et al. | |

It is certified that error appears in the above-identified patent and that said Letters Patent is hereby corrected as shown below:

In The Claims

In Column 13, Line 37, in Claim 8, delete "communication" and insert -- wireless communication --, therefor.

In Column 13, Line 55, in Claim 11, delete "communication" and insert -- wireless communication --, therefor.

In Column 15, Line 24, in Claim 20, delete "haing" and insert -- having --, therefor.

Signed and Sealed this
Third Day of February, 2015

Michelle K. Lee
*Deputy Director of the United States Patent and Trademark Office*